(12) United States Patent
Khan et al.

(10) Patent No.: US 11,074,008 B2
(45) Date of Patent: *Jul. 27, 2021

(54) TECHNOLOGIES FOR PROVIDING STOCHASTIC KEY-VALUE STORAGE

(71) Applicant: Intel Corporation, Santa Clara, CA (US)

(72) Inventors: Jawad B. Khan, Portland, OR (US); Richard Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 16/369,996

(22) Filed: Mar. 29, 2019

(65) Prior Publication Data
US 2019/0227739 A1 Jul. 25, 2019

(51) Int. Cl.
*G06F 12/00* (2006.01)
*G06F 3/06* (2006.01)
(Continued)

(52) U.S. Cl.
CPC .......... *G06F 3/0658* (2013.01); *G06F 3/0604* (2013.01); *G06F 3/0683* (2013.01); *G06F 9/30036* (2013.01); *G06F 11/10* (2013.01); *G06F 11/1048* (2013.01); *G06F 12/0207* (2013.01)

(58) Field of Classification Search
CPC ..... G06F 3/0658; G06F 3/0605; G06F 3/0683
See application file for complete search history.

(56) References Cited

U.S. PATENT DOCUMENTS 8,903,750 B1 * 12/2014 Bodkin .................. G06N 7/005
706/14
9,998,596 B1 * 6/2018 Dunmire ............. H04M 3/5158
(Continued)

OTHER PUBLICATIONS

Erwin W. Baumann et al., "Stochastic associative memory", Aug. 19, 1993, pp. 1-9, https://www.spiedigitallibrary.org/proceedings/Download?fullDOI=10.1117%2F12.152629 (Year: 1993).*

(Continued)

*Primary Examiner* — Daniel D Tsui
(74) *Attorney, Agent, or Firm* — Compass IP Law PC

(57) ABSTRACT

Technologies for performing a hyper-dimensional operation in a memory of the compute device include a memory and a memory controller. The memory controller is configured to receive a query from a requestor and determine, in response to a receipt of the query, a key hyper-dimensional vector associated with the query, perform a hyper-dimensional operation to determine a reference hyper-dimensional vector associated with a value to the key. The memory controller is further configured to perform a nearest neighbor search by searching columns of a stochastic associative array of a hyper-dimensional vector table in the memory, identify a closest matching row in the stochastic associative array relative to the reference hyper-dimensional vector, wherein the closest matching row indicates a closest matching value hyper-dimensional vector, and output a value associated with the closest matching value hyper-dimensional vector.

20 Claims, 11 Drawing Sheets

(51) Int. Cl.
*G06F 12/02* (2006.01)
*G06F 9/30* (2018.01)
*G06F 11/10* (2006.01)

(56) References Cited

U.S. PATENT DOCUMENTS

| | | | |
|---|---|---|---|
| 10,078,800 B2* | 9/2018 | Suri | G06N 3/049 |
| 10,180,808 B2* | 1/2019 | Li | G06F 3/0647 |
| 2018/0122456 A1* | 5/2018 | Li | G11C 11/405 |
| 2018/0167504 A1* | 6/2018 | Dunmire | H04M 3/5158 |
| 2018/0212837 A1* | 7/2018 | Kalluri | G06Q 30/0202 |
| 2018/0247354 A1* | 8/2018 | Pratt | H04L 47/10 |
| 2018/0285772 A1* | 10/2018 | Gopalan | G06N 7/005 |
| 2018/0295237 A1* | 10/2018 | Dunmire | H04M 3/5183 |
| 2018/0314982 A1* | 11/2018 | Gopalan | G06N 20/10 |

OTHER PUBLICATIONS

Pentti Kanerva, "Hyperdimensional Computing: An Introduction to Computing in Distributed Representation with High-Dimensional Random Vectors", 2009, pp. 1-21, http://rctn.org/vs265/kanerva09-hyperdimensional.pdf (Year: 2009).*

* cited by examiner

TECHNOLOGIES FOR PROVIDING STOCHASTIC KEY-VALUE STORAGE

BACKGROUND

Generally, performing calculations in hyper-dimensional space involves hyper-dimensional vectors, which are about 10,000 bits in length. For each word, rather than translating a word into ASCII or enumerated symbols, a system randomly creates a 10,000 bit value with a mixture of zeros and ones, called a hypervector. For example, during a hyper-dimensional operation, hyper-dimensional vectors for a key and a value are bound together by performing bit-wise XOR. Typically, to perform a hyper-dimensional operation, a processor of a compute device generates hyper-dimensional vectors for a key and a value in a memory, transfers the hyper-dimensional vectors from the memory to the processor, performs the hyper-dimensional operation, and transfers the resulted hyper-dimensional vector back to the memory to be stored. This process is energy and performance inefficient.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
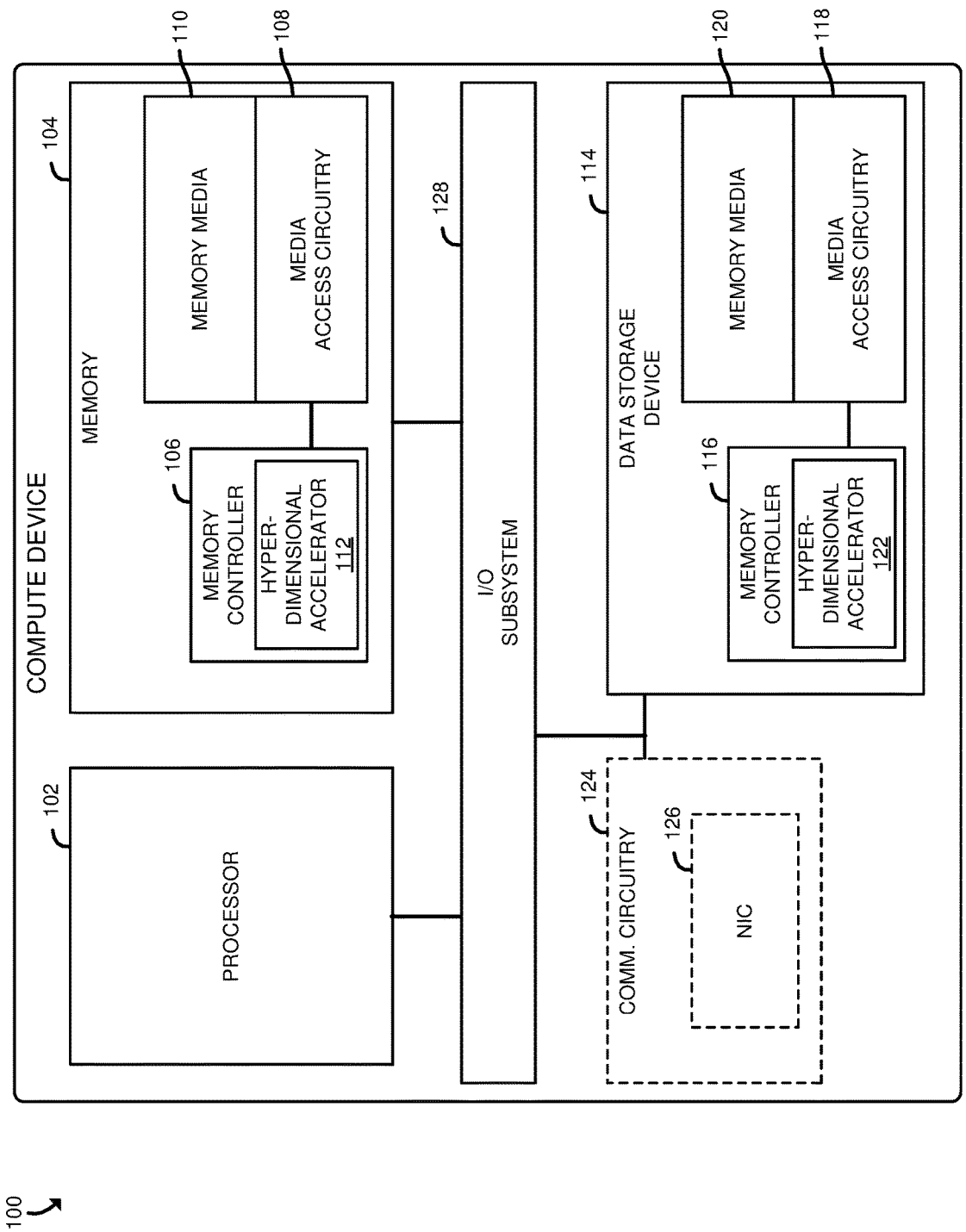
FIG. 1 is a simplified diagram of at least one embodiment of a compute device for performing a hyper-dimensional operation in a memory of the compute device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a compute device 100 for performing hyper-dimensional operations and stochastic associative search operations directly in a memory includes a processor 102, a memory 104, an input/output (I/O) subsystem 128, a data storage device 114, and communication circuitry 124. It should be appreciated that, in other embodiments, the compute device 100 may include other or additional components, such as those commonly found in a computer (e.g., a display, peripheral devices, etc.). Additionally, in some embodiments, one or more of the illustrative components may be incorporated in, or otherwise form a portion of, another component. As described herein, the compute device 100, and in particular, the memory 104 of the compute device 100 provides efficient access to selected rows and/or columns of data in the memory (e.g., writing to only the data within a specified column of a matrix, reading from only the data within the specified column, etc.).

Further, the compute device 100, in the illustrative embodiment, is configured to perform operations supporting hyper-dimensional primitives (e.g., bind, permute, or threshold) directly in the memory 104. To do so, the compute device 100 may generate hyper-dimensional vectors, which are about 10,000 bit values, associated with a key and a value. For example, if a key "Mexico" is related to a question "what is the currency of Mexico?" then a value to the key is "peso." In such an example, the compute device 100 may generate a random 10,000 bit vector associated with each of the key and the value, rather than translating the key and the value into ASCII or enumerated symbols. In the illustrative embodiment, the compute device 100 may bind (e.g., bitwise XOR operation) the hyper-dimensional key and the hyper-dimensional value directly in the memory 104 to generate a bound hyper-dimensional vector that may be used for future lookup operations by the key or value. Because the key and the value are bound together, this allows the artificial intelligence applications to interpret the following questions to have the same meaning: "what is the currency of Mexico?" or "what is the country of Peso?" By supporting the hyper-dimensional primitives in the memory 104, this obviates the need to transfer 10,000 bits of hyper-dimensional vectors from the memory 104 to the processor 102 to perform a hyper-dimensional operation. As a result, the system 100 may reduce power consumption and increase performance efficiency over typical systems. It should be understood that the memory of the data storage device 114 may additionally or alternatively include and perform similar features as the memory 104.

A hyper-dimensional operation theoretically introduces its own errors. As such, it is difficult to map data back to its original word (e.g., ASCII) after performing the hyper-dimensional mathematical operations. Referring back to the example above, the answer may not be mapped to the word "peso" because of the error introduced during the operation. Additionally, a hash function cannot be used because of the errors in the data. To remove the errors, the data, in the illustrative embodiment, is cleaned with a nearest neighbor search in the memory 104, instead of a linear search, to exit from the hyper-dimensional space to a lower dimensional space. To do so, the memory controller 106 may perform a stochastic associative search in which the memory controller 106 identifies a row that most closely matches (e.g., an inexact match) a reference hyper-dimensional vector (e.g., a hyper-dimensional answer generated with errors) using the ability to address (e.g., read the values of) each column of the memory 104 individually. In identifying the closest match, the memory controller 106 may determine which row in a set of rows to be compared to the reference hyper-dimensional vector has the greatest number of matching values to the reference hyper-dimensional vector (e.g., the reference data set has a 1 as the first bit, and the row also contains a 1 as the first bit, the reference data set has a 0 as the second bit and the row also contains a 0 as the second bit, etc.). In doing so, rather than comparing the entire reference hyper-dimensional vector to the entirety of the column values for each row in the set of rows to be searched, the memory controller 106 may compare only a subset of the column values to the reference hyper-dimensional vector. In performing the search, the memory controller 106 may perform a stochastic search on sparse data (e.g., only 10% of the bits are set to 1), a stochastic search on dense data (e.g., 50% of the bits are 1 and 50% of the bits are 0), or a field search within a vector (e.g., a specific section of a larger data structure). As such, the memory 104 provides functionality similar to that of a content addressable memory (CAM), but at a much lower cost than the CAM (due to differences in manufacturing costs) and, unlike the CAM, provides the ability to identify a closest match, rather than only being able to identify an exact match. The ability to identify the closest inexact match is one of the key features to enable machine learning operations (e.g., in a memory-augmented neural network).

The processor 102 may be embodied as any device or circuitry (e.g., a multi-core processor(s), a microcontroller, or other processor or processing/controlling circuit) capable of executing a workload (e.g., a set of operations, such as an application that may produce requests to read from and/or write to sections of memory, such as selected columns and/or rows of data in a matrix, and/or send a request to the memory 104 to perform an in-memory hyper-dimensional operation or a stochastic associative search on the bit-addressable memory 104), and/or performing other operations described herein. In some embodiments, the processor 102 may be embodied as, include, or be coupled to a field-programmable gate array (FPGA), an application specific integrated circuit (ASIC), reconfigurable hardware or hardware circuitry, or other specialized hardware to facilitate performance of the functions described herein.

The memory 104, which may include a non-volatile memory (e.g., a far memory in a two-level memory scheme), includes a memory media 110, media access circuitry 108 (e.g., a device or circuitry, such as integrated circuitry constructed from complementary metal-oxide-semiconductors (CMOS) or other materials) underneath the memory media 110. The media access circuitry 108 is also connected to a memory controller 106, which may be embodied as any device or circuitry (e.g., a processor, a co-processor, dedicated circuitry, etc.) configured to selectively read from and/or write to the memory media 110 (e.g., in response to requests from the processor 102, which may be executing an application seeking to read from or write to the memory media 110). In some embodiments, the memory controller 106 may be included in the same die as the media access circuitry 108. In other embodiments, the memory controller 106 may be on a separate die but in the same package as the media access circuitry 108. In yet other embodiments, the memory controller 106 may be in a separate die and separate package but on the same dual in-line memory module (DIMM) or board as the media access circuitry 108. Similarly, in some embodiments, the media access circuitry 108 may be included in the same die as the memory media 110. In other embodiments, the media access circuitry 108 may be on a separate die but in the same package as the memory media 110. In yet other embodiments, the media access circuitry 108 may be in a separate die and separate package but on the same dual in-line memory module (DIMM) or board as the memory media 110.

Figure 2:
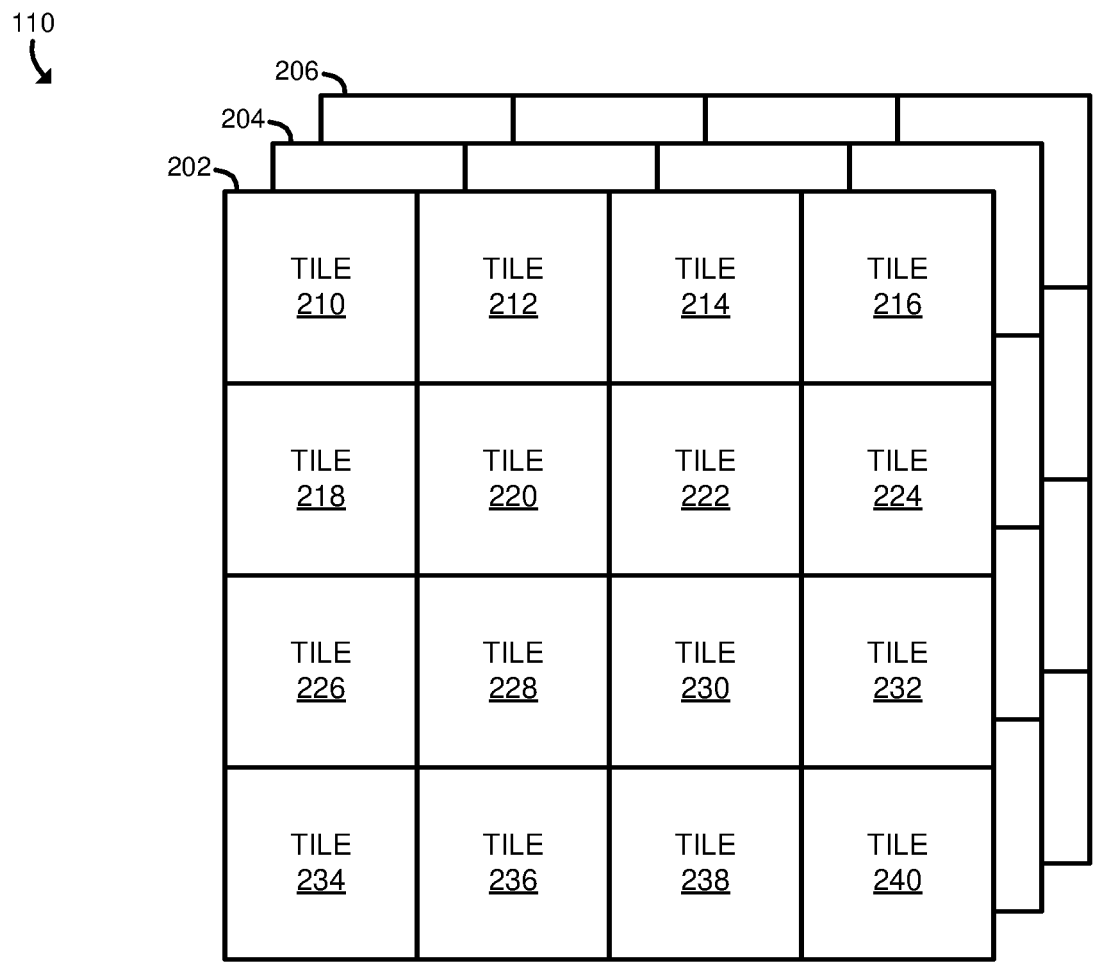
FIG. 2 is a simplified diagram of at least one embodiment of a memory media included in the compute device of FIG. 1.

Referring briefly to FIG. 2, the memory media 110, in the illustrative embodiment, includes a set of tiles 210, 212, 214, 216, 218, 220, 222, 224, 226, 228, 230, 232, 234, 236, 238, 240 (e.g., each an addressable section of the memory media 110 capable of retaining data) arranged in a cross point architecture (e.g., an architecture in which memory cells sit at the intersection of word lines and bit lines and are individually addressable and in which bit storage is based on a change in bulk resistance), in which each tile is addressable by an x parameter and a y parameter (e.g., a column and a row). A set of tiles form a partition and multiple partitions may be stacked as layers 202, 204, 206 to form a three-dimensional cross point architecture (e.g., Intel 3D XPoint™ memory). Unlike typical memory devices, in which only fixed-size multiple-bit data structures (e.g., byte, words, etc.) are addressable, the media access circuitry 108 is configured to read individual bits, or other units of data, from the memory media 110 at the request of the memory controller 106, which may produce the request in response to receiving a corresponding request from the processor 102. Additionally, in the illustrative embodiments, the memory controller 106 further includes a hyper-dimensional accelerator 112, which may be embodied as any device or circuitry (e.g., a processor, a co-processor, dedicated circuitry, etc.) configured to generate a hyper-dimensional vector table to store hyper-dimensional vectors for keys and values in the memory 104.

Furthermore, the hyper-dimensional accelerator 112 is configured to generate hyper-dimensional vectors for a key and a value to the key, perform hyper-dimensional operations on the hyper-dimensional vectors (e.g., to bind the hyper-dimensional vectors of the key and the value), and write the hyper-dimensional vectors and resulting data (e.g., a hyper-dimensional vector to be used for future lookups) to the memory media 110. The hyper-dimensional accelerator 112 may further be configured to receive a query from a requestor (e.g., the processor 102), determine a reference hyper-dimensional vector associated with the query, and perform a nearest neighbor search to determine a closest matching value to the reference hyper-dimensional vector in the memory 104. Specifically, in the illustrative embodiment, the hyper-dimensional accelerator 112 may search columns of a stochastic associative array in the memory 104 for a matching bit value relative to a corresponding bit of the reference hyper-dimensional vector to identify a value with a highest number of matching values (i.e., a shortest Hamming distance). It should be appreciated that the hamming distance between two strings of equal length represents a number of positions at which the corresponding symbols are different.

The memory 104 may include non-volatile memory and volatile memory. The non-volatile memory may be embodied as any type of data storage capable of storing data in a persistent manner (even if power is interrupted to the non-volatile memory). For example, the non-volatile memory may be embodied as one or more non-volatile memory devices. The non-volatile memory devices may include one or more memory devices configured in a cross-point architecture that enables bit-level addressability (e.g., the ability to read from and/or write to individual bits of data, rather than bytes or other larger units of data), and are illustratively embodied as three-dimensional (3D) crosspoint memory. In some embodiments, the non-volatile memory may additionally include other types of memory, including any combination of memory devices that use chalcogenide phase change material (e.g., chalcogenide glass), ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM. The volatile memory may be embodied as any type of data storage capable of storing data while power is supplied volatile memory. For example, the volatile memory may be embodied as one or more volatile memory devices, and is periodically referred to hereinafter as volatile memory with the understanding that the volatile memory may be embodied as other types of non-persistent data storage in other embodiments. The volatile memory may have an architecture that enables bit-level addressability, similar to the architecture described above.

The processor 102 and the memory 104 are communicatively coupled to other components of the compute device 100 via the I/O subsystem 128, which may be embodied as circuitry and/or components to facilitate input/output operations with the processor 102 and/or the main memory 104 and other components of the compute device 100. For example, the I/O subsystem 128 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 128 may form a portion of a system-on-a-chip (SoC) and be incorporated, along with one or more of the processor 102, the main memory 104, and other components of the compute device 100, in a single chip.

The data storage device 114, may be embodied as any type of device configured for short-term or long-term storage of data such as, for example, memory devices and circuits, memory cards, hard disk drives, solid-state drives, or other data storage device. In the illustrative embodiment, the data storage device 114 includes a memory controller 116, similar to the memory controller 106, media access circuitry 118, similar to the media access circuitry 108, memory media 120, similar to the memory media 110, and a hyper-dimensional accelerator 122, similar to the hyper-dimensional accelerator 112. As such, in the illustrative embodiment, the data storage device 114 is capable of performing a set of in-memory compute operations, using a hyper-dimensional accelerator 122 between the media access circuitry 118 and the memory media 120. The data storage device 114 may include a system partition that stores data and firmware code for the data storage device 114 and one or more operating system partitions that store data files and executables for operating systems.

The communication circuitry 124 may be embodied as any communication circuit, device, or collection thereof, capable of enabling communications over a network between the compute device 100 and another device. The communication circuitry 124 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 124 includes a network interface controller (NIC) 126, which may also be referred to as a host fabric interface (HFI). The NIC 126 may be embodied as one or more add-in-boards, daughter cards, network interface cards, controller chips, chipsets, or other devices that may be used by the compute device 100 to connect with another compute device. In some embodiments, the NIC 126 may be embodied as part of a system-on-a-chip (SoC) that includes one or more processors, or included on a multichip package that also contains one or more processors. In some embodiments, the NIC 126 may include a local processor (not shown) and/or a local memory (not shown) that are both local to the NIC 126. In such embodiments, the local processor of the NIC 126 may be capable of performing one or more of the functions of the processor 102. Additionally or alternatively, in such embodiments, the local memory of the NIC 126 may be integrated into one or more components of the compute device 100 at the board level, socket level, chip level, and/or other levels.

Figure 3:
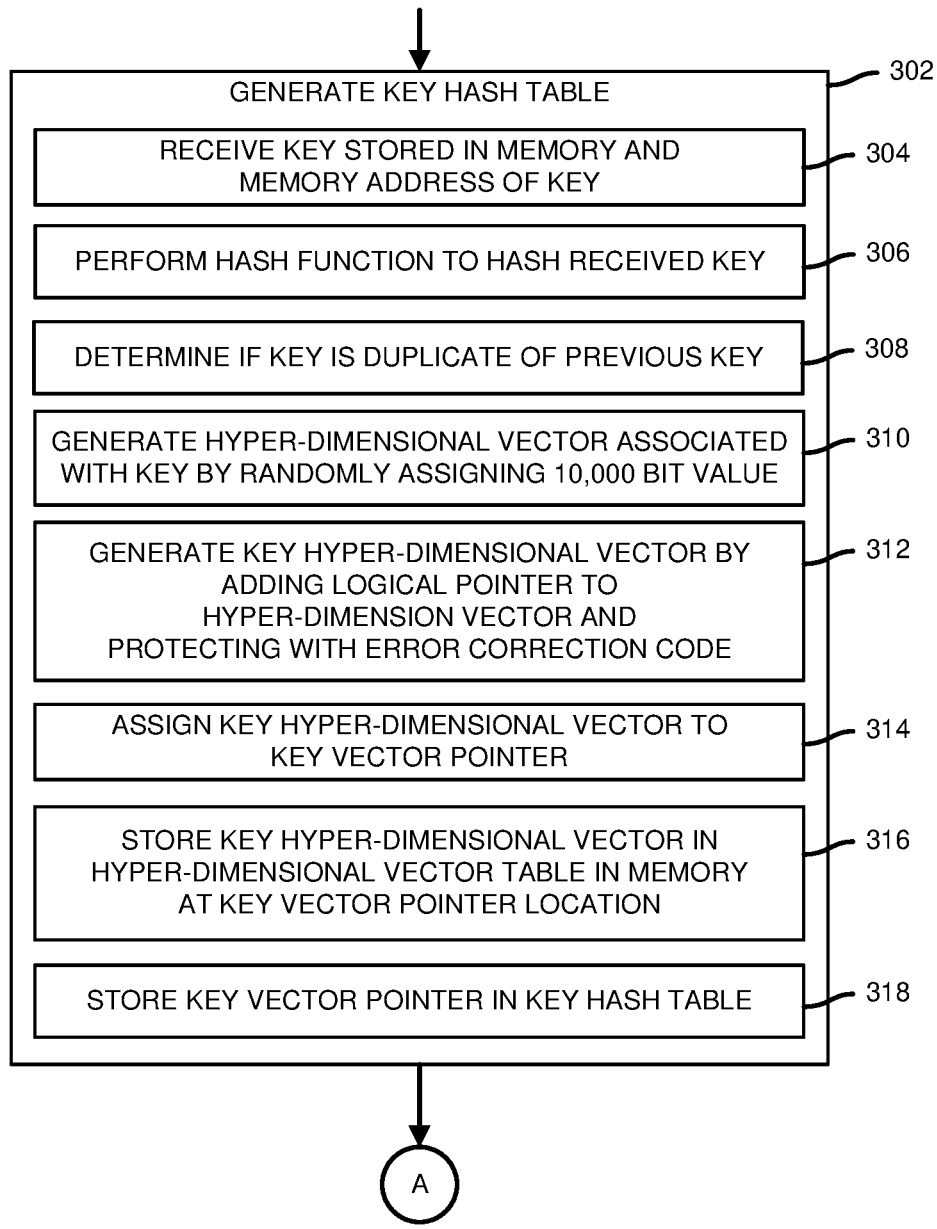
FIGS. 3-5 are a simplified flow diagram of at least one embodiment of a method for providing a hyper-dimensional vector table that includes stochastic key hyper-dimensional vectors and value hyper-dimensional vectors in the memory to be used to generate a search hyper-dimensional vector that may be performed by the memory of the compute device of FIG. 1.
Figure 4:
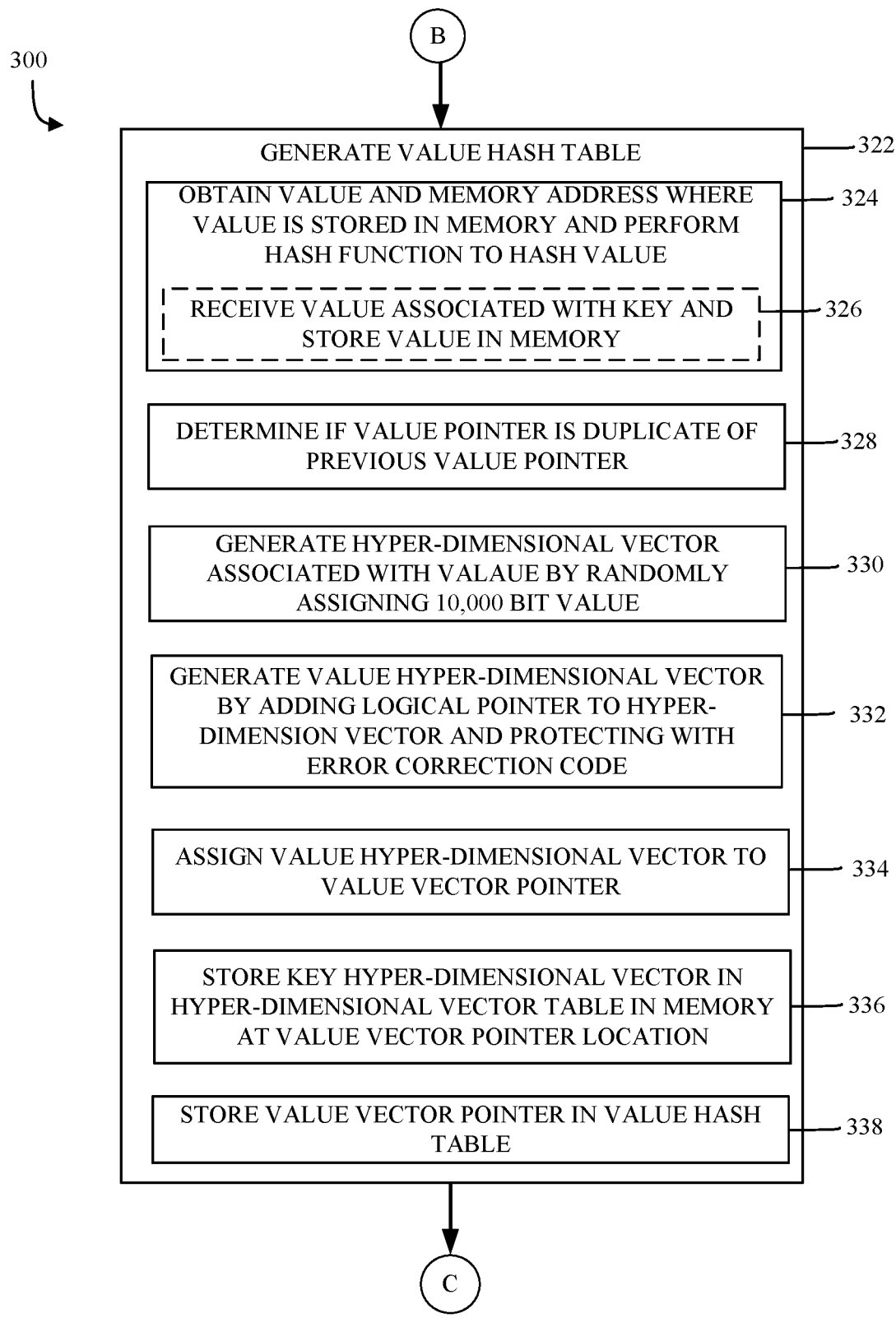

Referring now to FIGS. 2-4, the hyper-dimensional accelerator 112 of the compute device 100, in operation, may execute a method 300 for generating a hyper-dimensional vector table that includes stochastic key hyper-dimensional vectors and value hyper-dimensional vectors in the memory 104 to be used to generate a search hyper-dimensional vector. The method 300 is described with reference to the memory 104. However, it should be understood that the method 300 could be additionally or alternatively performed using the memory of the data storage device 114.

The method 300 begins with block 302, in which the hyper-dimensional accelerator 112 of the memory 104 generates a key hash table. The key hash table stores a plurality of key pointers, in which each key pointer is assigned to a key hyper-dimensional vector. In the illustrative embodiment, the plurality of pointers are arranged in a linked list data structure. To generate the key hash table the hyper-dimensional accelerator 112 receives a key stored in the memory 104 and a memory address of the key as indicated in block 304. For example, a key may be "Mexico", related to a question "what is the currency of Mexico?" Subsequently, in block 306, the hyper-dimensional accelerator 112 performs a hash function to hash the received key. This allows the hyper-dimensional accelerator 112 to detect duplicated records in the key hash table as indicated in block 308. If the key is not a duplicate of a previously received key, the hyper-dimensional accelerator 112 generates a hyper-dimensional vector associated with the key by randomly assigning a 10,000 bit value as indicated in block 310. Subsequently, in block 312, the hyper-dimensional accelerator 112 generates a key hyper-dimensional vector by adding a logical pointer to the hyper-dimensional vector associated with the key which is protected with an error correction code. It should be appreciated that the logical pointer associated with the key indicates the memory address where the key is stored in the memory 104.

In block 314, the hyper-dimensional accelerator 112 assigns the key hyper-dimensional vector to a key pointer. Accordingly, the hyper-dimensional accelerator 112 stores the key hyper-dimensional vector in a hyper-dimensional vector table in the memory 104 at the key pointer location as indicated in block 316. Subsequently or concurrently, the hyper-dimensional accelerator 112 also stores the key pointer in the key hash table as indicated in block 318.

Subsequently or concurrently, in block 322 of FIG. 4, the hyper-dimensional accelerator 112 generates a value hash table. The value hash table stores a plurality of pointers, in which each pointer is assigned to a value hyper-dimensional vector. In the illustrative embodiment, the pointers are arranged in a linked list data structure. To generate the value hash table, the hyper-dimensional accelerator 112 obtains a value to the key and a memory address of the value where the value is stored in the memory 104 and performs a hash function to hash the value as indicated in block 324. To do so, in some embodiments, the hyper-dimensional accelerator 112 may receive a value to the key and store the value in the memory 104 as indicated in block 326. For example, if a key is "what is the currency of Mexico?" the value to the key is "peso."

Hashing the value allows the hyper-dimensional accelerator 112 to detect duplicated records in the value hash table as indicated in block 328. If the value is not a duplicate of a previous value, the hyper-dimensional accelerator 112 generates a hyper-dimensional vector associated with the value by randomly assigning a 10,000 bit value, where the number of 1's may be sparse (only 10% or less number of bits set), as indicated in block 330. Subsequently, in block 332, the hyper-dimensional accelerator 112 generates a value hyper-dimensional vector by adding a logical pointer to the hyper-dimensional vector associated with the key which is protected with an error correction code. It should be appreciated that the logical pointer associated with the value indicates the memory address where the key is stored in the memory 104.

In block 334, the hyper-dimensional accelerator 112 assigns the value hyper-dimensional vector to a value pointer. Accordingly, the hyper-dimensional accelerator 112 stores the value hyper-dimensional vector in a hyper-dimensional vector table in the memory 104 at the value pointer location as indicated in block 336. Subsequently or concurrently, the hyper-dimensional accelerator 112 also stores the value pointer in the value hash table, as indicated in block 338.

Figure 5:
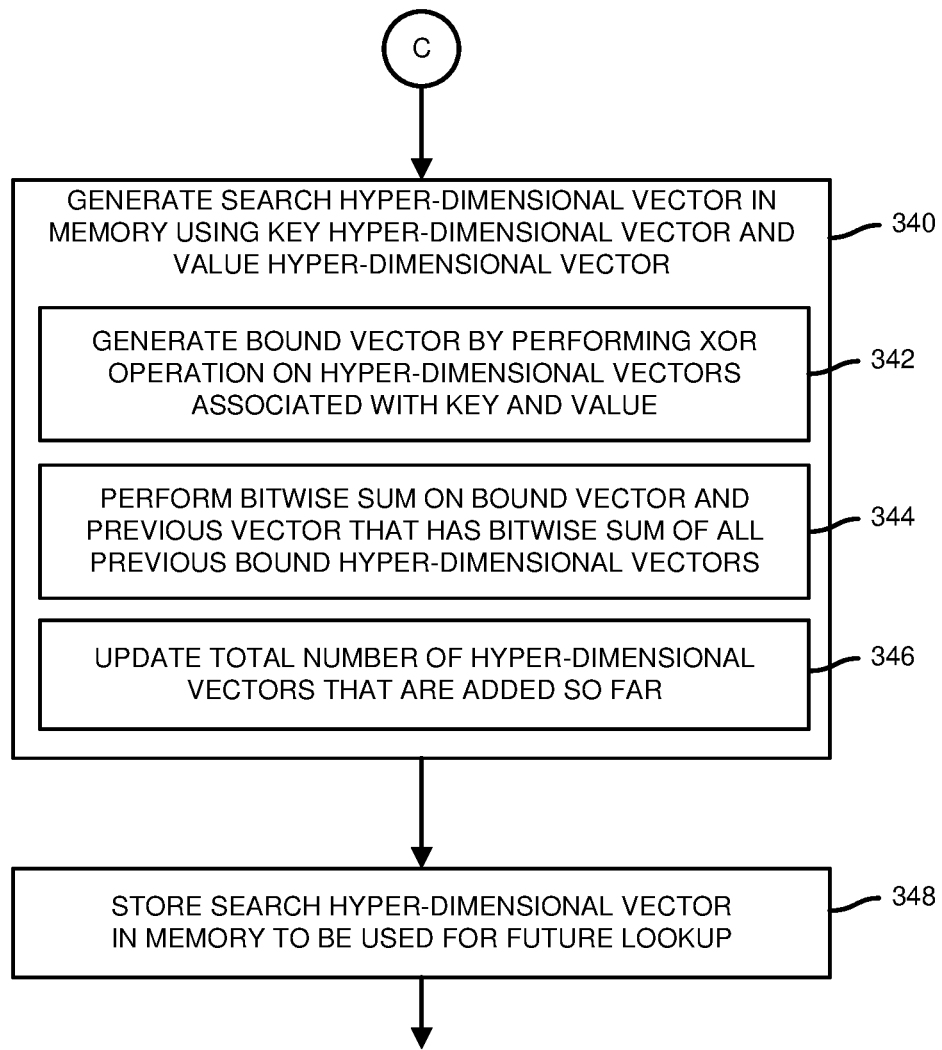

Subsequently, in block 340 of FIG. 5, the hyper-dimensional accelerator 112 generates a search hyper-dimensional vector in the memory 104 using a key hyper-dimensional vector and a value hyper-dimensional vector. Specifically, hyper-dimensional operations occur on the hyper-dimensional vectors associated with the key and the value (i.e., the key and the value hyper-dimensional vectors without the logical pointer and the error correction code) but not on the logical pointers and the error correction code portions of the key and the value hyper-dimensional vectors. To do so, in block 342, the hyper-dimensional accelerator 112 generates a bound hyper-dimensional vector by performing a bitwise XOR operation on the hyper-dimensional vectors associated with the key and the value. Additionally, in block 344, the hyper-dimensional accelerator 112 performs a bitwise sum on the bound hyper-dimensional vector and a previous vector that has a bitwise sum of all the previous bound hyper-dimensional vectors. The hyper-dimensional accelerator 112 further updates a total number of hyper-dimensional vectors that are added so far, as indicated in block 346.

Subsequently, in block 348, the hyper-dimensional accelerator 112 stores the search hyper-dimensional vector in the memory 104 to be used for future lookup. It should be appreciated that, although the method 300 is described as being executed by the hyper-dimensional accelerator 112, any component of the memory 104 may perform the method 300.

Figure 6:
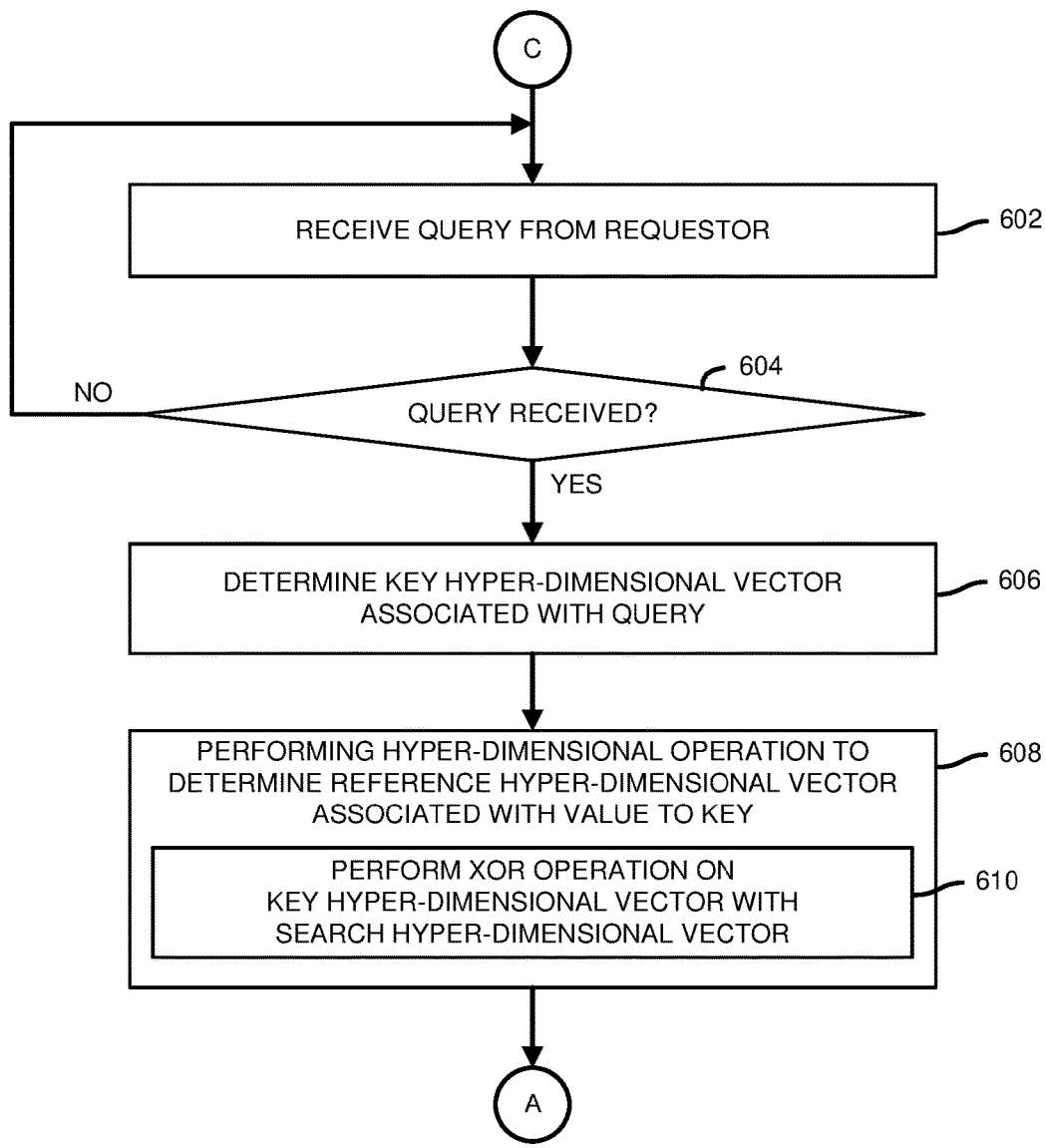
FIGS. 6-8 are a simplified flow diagram of at least one embodiment of a method for performing a nearest neighbor search to determine closest matching data in the memory relative to a reference hyper-dimensional vector that may be performed by the memory of the compute device of FIG. 1.
Figure 7:
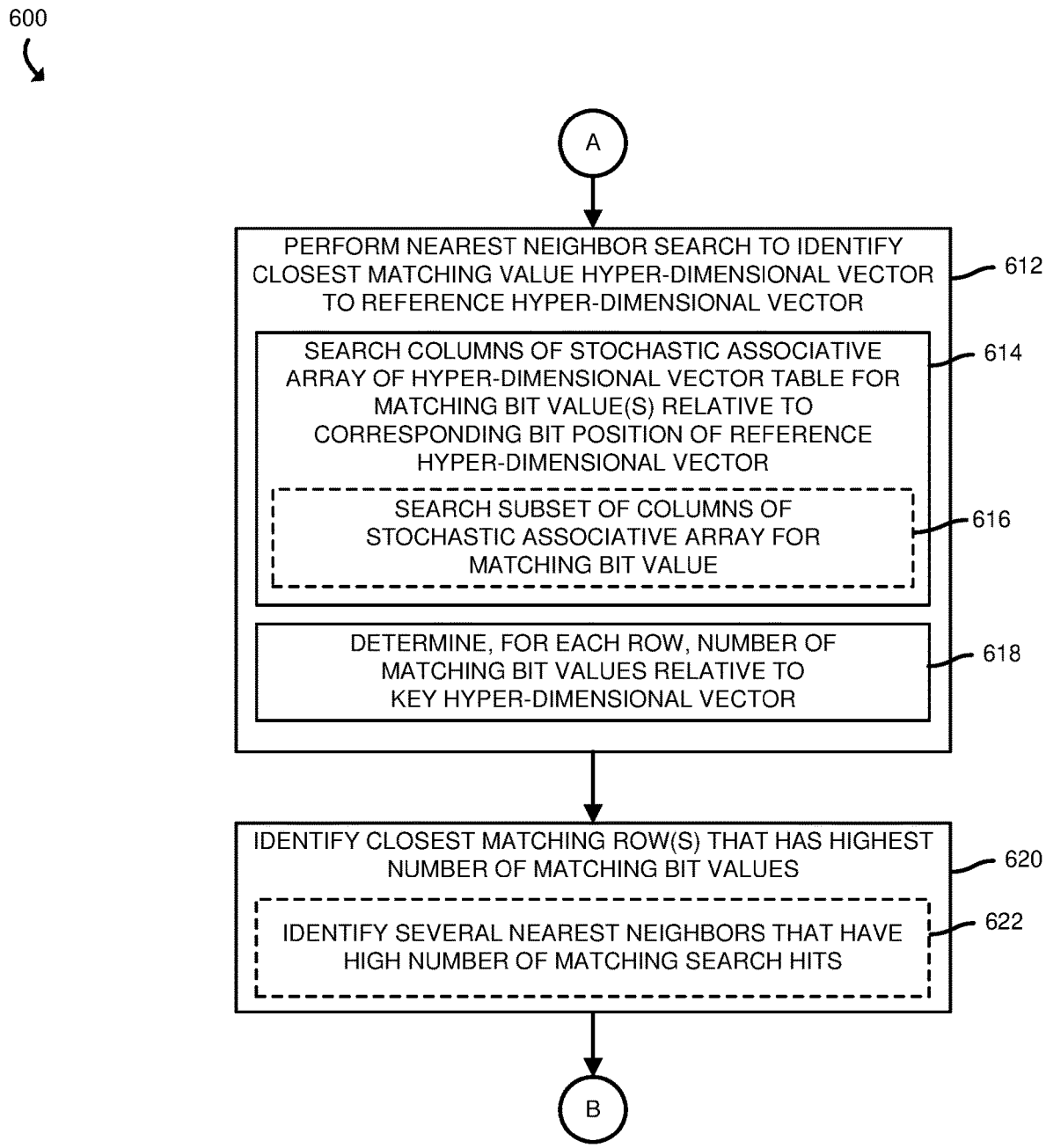

Referring now to FIGS. 6-7, the hyper-dimensional accelerator 112 of the compute device 100, in operation, may execute a method 600 for performing a nearest neighbor search to determine closest matching data in memory relative to a key hyper-dimensional vector. The method 600 is described with reference to the memory 104. However, it should be understood that the method 600 could be additionally or alternatively performed using the memory of the data storage device 114. The method 600 begins with block 602, in which the hyper-dimensional accelerator 112 receives a query from a requestor. For example, the hyper-dimensional accelerator 112 may receive a request from the processor 102, which may be executing an application seeking to have machine learning operations performed on data stored in the memory media 110. In block 604, if the hyper-dimensional accelerator 112 determines that a query has not been received, the method 600 loops back to block 602 to continue to await a query. If, however, the hyper-dimensional accelerator 112 determines that a query has been received, the method 600 advances to block 606. In block 606, the hyper-dimensional accelerator 112 determines a key hyper-dimensional vector associated with the query. In the illustrative embodiment, the query may include a memory address of a key hyper-dimensional vector in the memory 104. In such embodiment, the hyper-dimensional accelerator 112 may obtain the key hyper-dimensional vector associated with the query.

Once the key hyper-dimensional vector is determined or obtained, the hyper-dimensional accelerator 112 performs a hyper-dimensional operation to determine a reference hyper-dimensional vector associated with a value to the key as indicated in block 608. To do so, in block 610, the hyper-dimensional accelerator 112 performs a XOR operation on the key hyper-dimensional vector with a search hyper-dimensional vector. Specifically, the XOR operation occurs on the hyper-dimensional vectors associated with the key and the search value (i.e., the key and the search hyper-dimensional vectors without the logical pointer and the error correction code) but not on the logical pointers and the error correction code portions of the key and the search hyper-dimensional vectors. In the illustrative embodiment, the search hyper-dimensional vector is generated by dividing the hyper-dimensional vector generated by performing XOR and bit-sum operations (e.g., obtained in block 344) by the total number of hyper-dimensional vector entries (e.g., obtained in block 346). If the result is less than 0.5, a value 1 is placed in the bit position of the search hyper-dimensional vector, otherwise, a value 0 is placed in the bit position. This is referred to as a threshold operation. As a result, when the XOR operation is performed by using the search hyper-dimensional vector and either the value or key corresponding to any bound vector (e.g., obtained in block 342), the resulting vector (i.e., the reference hyper-dimensional vector) is expected to be close to the related bound hyper-dimensional vector in the hamming space. It should be appreciated that the reference hyper-dimensional vector resulted from the hyper-dimensional vector operation (e.g. XOR) includes errors introduced during the threshold hyper-dimensional operation described above. As such, the reference hyper-dimensional vector may not exactly match a value hyper-dimensional vector associated with a value to the key in the hyper-dimensional vector table.

Figure 10:
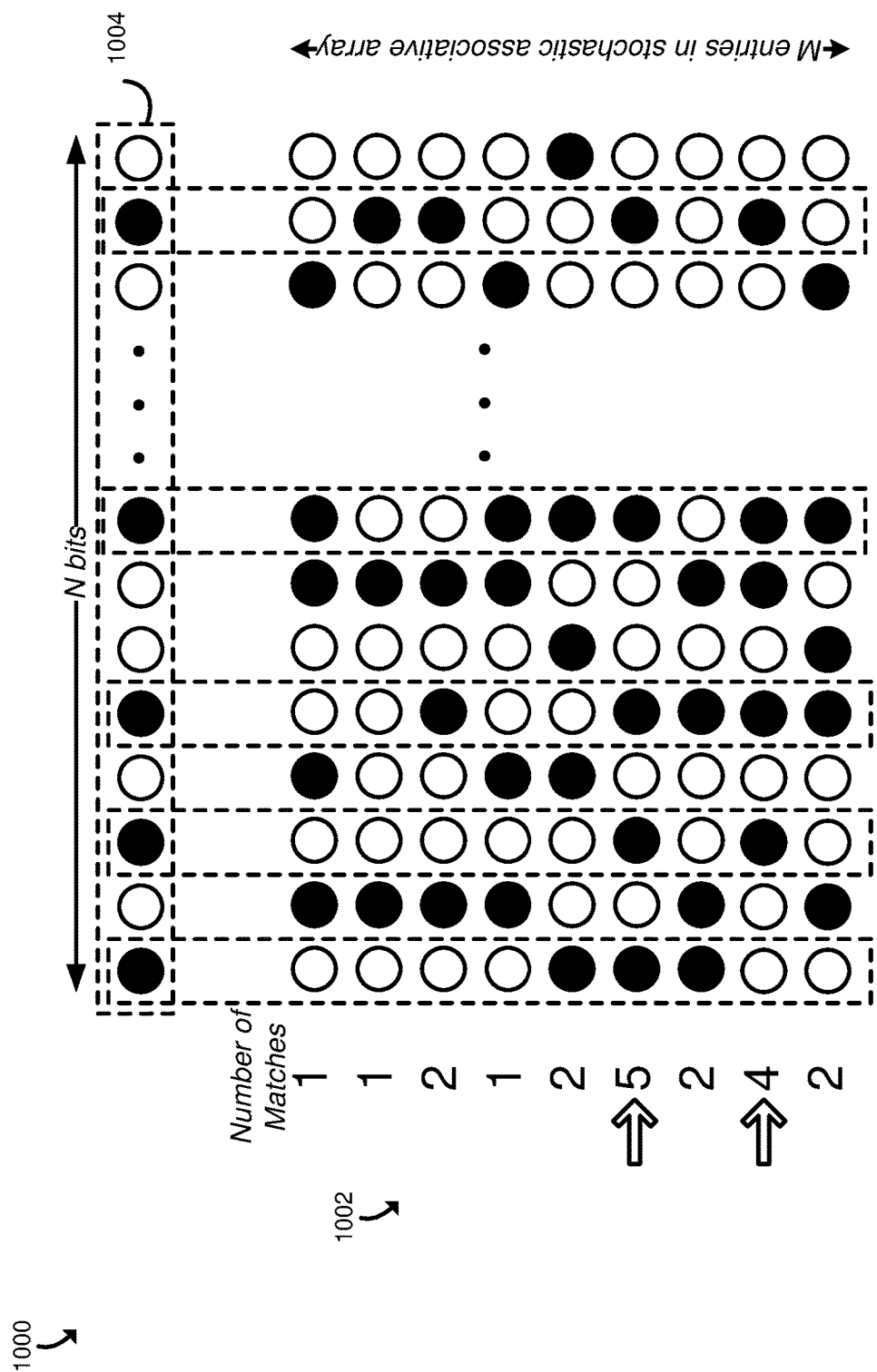
FIGS. 10 and 11 are simplified conceptual diagrams of examples of performing a stochastic associative search on memory.
Figure 11:
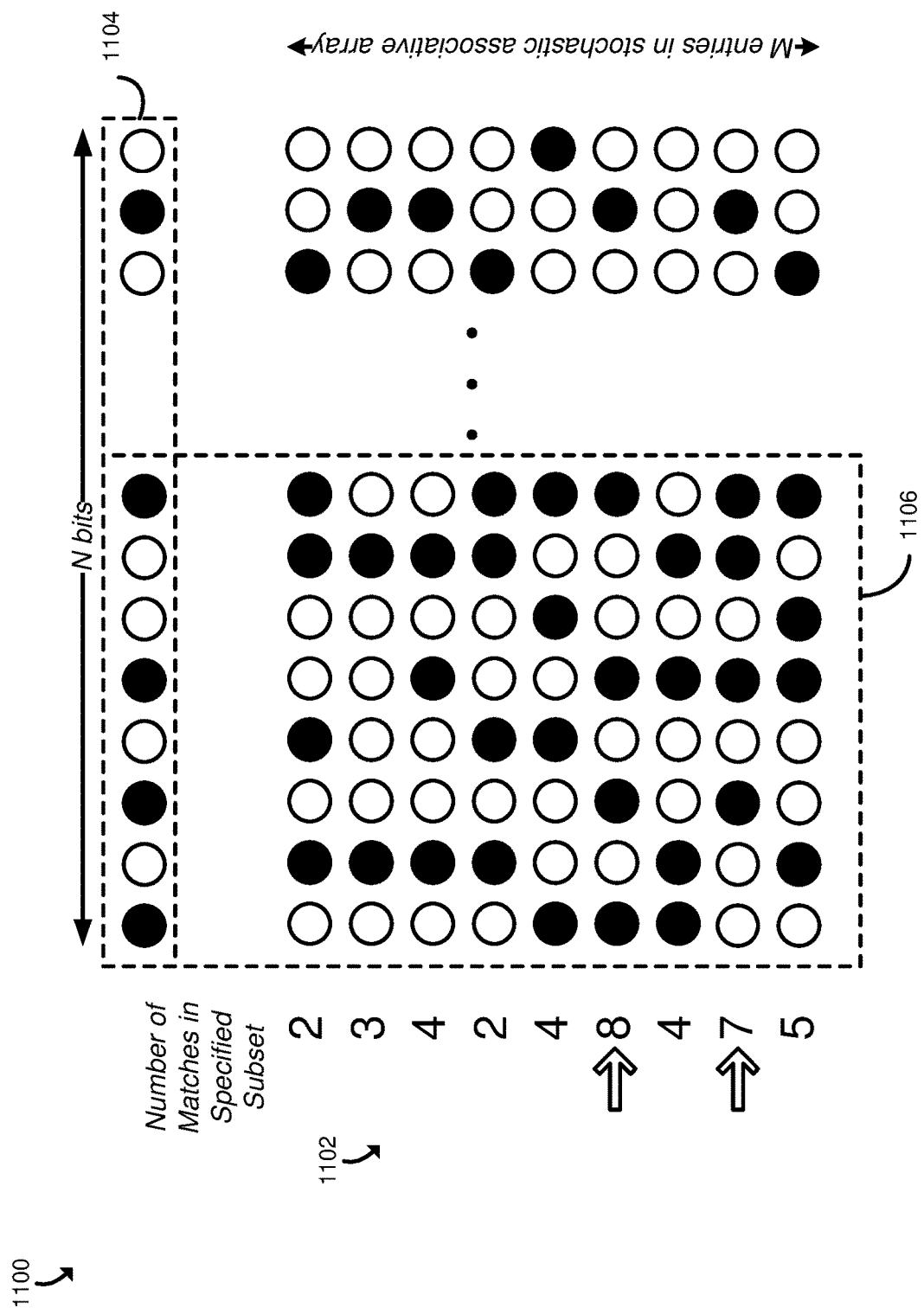

As such, in block 612 of FIG. 7, the hyper-dimensional accelerator 112 performs a nearest neighbor search to identify a closest matching value hyper-dimensional vector to the resulting hyper-dimensional vector. To do so, in block 614, the hyper-dimensional accelerator 112 searches columns of a stochastic associated array of the hyper-dimensional vector table in the memory 104 for matching bit values relative to the corresponding bit position of the reference hyper-dimensional vector (e.g., the reference hyper-dimensional vector has a 1 as the first bit, and the row also contains a 1 as the first bit, the reference hyper-dimensional vector has a 0 as the second bit and the row also contains a 0 as the second bit, etc.). In other words, the hyper-dimensional accelerator 112 determines which row in a set of rows of the stochastic associated array to be compared to the reference hyper-dimensional vector has the greatest number of matching bit values to the reference hyper-dimensional vector, as illustrated in FIG. 10. In some embodiments, in block 616, the hyper-dimensional accelerator 112 may compare only a subset of the column values to the reference hyper-dimensional vector, rather than comparing the entire reference hyper-dimensional vector to the entirety of the column values for each row in the set of rows to be searched, as illustrated in FIG. 11. In block 618, the hyper-dimensional accelerator 112 determines, for each row, a number of matching bit values relative to the reference hyper-dimensional vector.

In block 620, the hyper-dimensional accelerator 112 identifies the closest matching row that has the highest number of matching bit values (i.e., a shortest Hamming distance) relative to the reference hyper-dimensional vector. In some embodiments, the hyper-dimensional accelerator 112 may identify a set of nearest neighbors that have a relatively high number of matching bit values as indicated in block 622. For example, the hyper-dimensional accelerator 112 may identify the nearest neighbors that have matching bit values exceeding a predefined threshold number.

Figure 8:
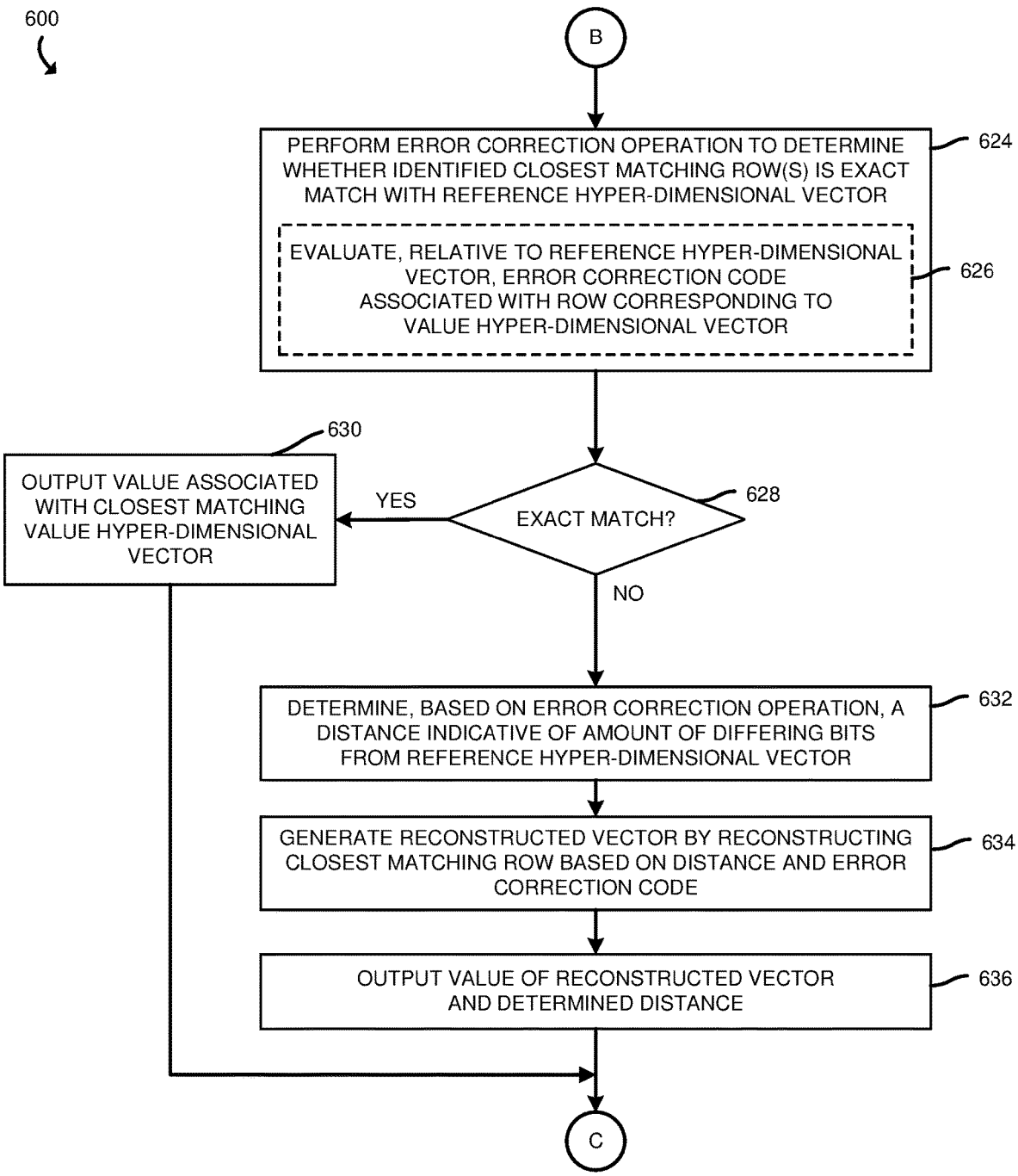

Subsequently, in block 624 of FIG. 8, the hyper-dimensional accelerator 112 performs an error correction algorithm based on the error correction code associated with each identified closest matching row to detect and correct one or more errors.

In block 626, the hyper-dimensional accelerator 112 generates a reconstructed value hyper-dimensional vector by reconstructing a subset of data from the closest matching value hyper-dimensional vector(s) based on the distance and the error correction code. In block 628, the hyper-dimensional accelerator 112 determines a logical pointer from the reconstructed value hyper-dimensional vector and outputs (e.g., to a requesting application) the determined distance and the value associated with the closest value hyper-dimensional vector stored at the logical pointer location.

It should be appreciated that the ability to identify the closest inexact match is one of key features to enable the approximate nearest neighbor search or similarity search. It should also be appreciated that, although the method 600 is described as being executed by the hyper-dimensional accelerator 112, any component of the memory 104 may perform the method 600. Additionally, it should be appreciated that the method 600 is also applicable to find a key in response to receiving a query that includes a value.

Figure 9:
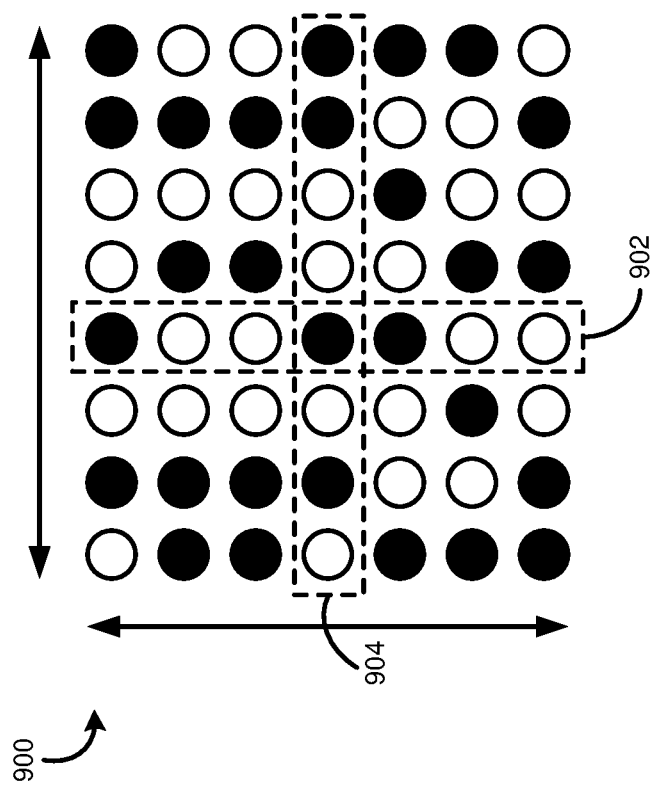
FIG. 9 is a simplified conceptual diagram of at least one embodiment of a memory matrix providing row- and column-major bit addressability in which a stochastic associative search operation may be performed.

Referring now to FIG. 9, a conceptual diagram 900 of a matrix of data including multiple rows and multiple columns of data, in which particular rows and/or columns may be selected for access (e.g., read and/or write) is shown. As discussed above, the memory 104 may be arranged in a three-dimensional cross point architecture (e.g., Intel 3D XPoint™ memory), which uses bit-addressable tiles, instead of using word-lines and bit-lines for page data. In the matrix data 900, the tiles are represented as dots, in which black dots are indicative of memory cells that are occupied (e.g., a bit stored in the memory cell is set to a bit value of 1) and in which white dots are indicative of matrix cells that are unoccupied (or otherwise as a bit value of 0).

In the illustrative embodiment, a column selection 902 is shown in which output from a read-out of the column selection 902 corresponds to data from each row in the matrix along the column. The output is indicative of portions of data for a page read from the compute device 100. Further, a row selection 904 is shown in which output from a read-out of the row selection 904 corresponds to data from each column in the matrix along the row. The output is indicative of portions of data for a page read from the compute device 100. This allows column-major access to occur without need for intermediary matrix transpose operations (e.g., on rows of the matrix).

As a result, the compute device 100 can retrieve a desired subset of data (e.g., in response to a query from an application, by performing, in part, column access operations). More particularly, the compute device 100 may evaluate columns against a reference hyper-dimensional vector to be searched. Rather than iterate through rows of the matrix to find a subset of bit data (e.g., based on a reference hyper-dimensional vector set provided by the application), the compute device 100 may evaluate bit values at a column to determine whether a bit value at a given column index matches a bit value at a corresponding position in the reference hyper-dimensional vector. The compute device 100 may maintain a counter per row indicative of instances in which a column bit value at an index associated with the row matches with a bit value at the corresponding position in the reference hyper-dimensional vector. A row having a relatively high value (e.g., a value that exceeds a specified threshold) can be identified as candidate data that may correspond to the requested subset of data. Further, the compute device 100 may rank the candidate data (i.e., rows) based on the counter associated with the corresponding rows and return the results to the requesting application. Using a value such as a threshold can eliminate the need to continue searching each column, which is advantageous because the reference hyper-dimensional vector is relatively large (e.g., tens of thousands of bits). As a result, search operations for a given subset of data may be processed relatively faster and more efficiently by the compute device 100. Consequently, the identified candidate data serves as a stochastic approximation, which is useful in various cases, such as in instances where an application does not need an exact match for the subset of data, or for data where the closest match within a specified threshold does correspond to the desired subset.

Referring now to FIG. 10, an exemplary conceptual diagram 1000 of performing a stochastic associative search on memory is shown. In this example, it is assumed that data is distributed sparsely throughout a matrix 1002. Illustratively, a reference hyper-dimensional vector 1004 expands to N bits (e.g., about 10,000 bits), which is the same length of the rows in the matrix 1002. The matrix 1002 also includes M entries as part of a stochastic associative array. The reference hyper-dimensional vector 1004 is indicative of reference data having set bits in particular positions therein, represented in FIG. 10 as filled dots. Because the matrix 1002 is representative of a sparse matrix, the compute device 100 searches only the columns of the matrix 1002 that correspond to positions in the reference hyper-dimensional vector 1004 having set bits, as indicated by the dotted rectangles running vertical down from the reference hyper-dimensional vector 1004. It should be appreciated that, in some embodiments where zeros are sparse in the reference hyper-dimensional vector, the compute device 100 may search the columns of the matrix that correspond to positions in the reference hyper-dimensional vector having clear bits. Doing so reduces the amount of time spent by the compute device 100 performing a stochastic associative search operation on the data because the compute device 100 does not evaluate every column of the matrix 1002. As discussed above, the compute device 100 may maintain a counter to associate with each row that is indicative of a number of matches in column indices associated with the row to the reference hyper-dimensional vector 1004. In this case, the compute device 100 identifies, in the sparse matrix 1002, two matrices as candidate data (indicated by the one-way arrows pointing to the rows). The two candidate data are associated with five matches and four matches. The compute device 100 may return, to a requesting application, each of the candidate data, a location associated with each data, as well as information relating to the number of matches. An application, in turn, may process such data as needed.

Referring now to FIG. 11, another exemplary conceptual diagram 1100 of performing a stochastic associative search on memory is shown. In this example, it is assumed that data is distributed densely throughout a matrix 1102. The example may also apply to a situation in which the compute device 100 receives a request to search a specified subset 1106 of columns in the matrix. Illustratively, a reference hyper-dimensional vector 1104 expands to N bits (e.g., about 10,000 bits), which is the same length of the rows in the matrix 1102. The matrix 1102 also includes M entries as part of a stochastic associative array. The reference hyper-dimensional vector 1104 is indicative of a reference data having set bits in particular positions therein, represented in FIG. 11 as filled dots. In this example, the compute device 100 searches only the specified subset 1106 of columns. Doing so reduces the amount of time spent by the compute device 100 performing a stochastic associative search operation on the data because the compute device 100 does not evaluate every column of the matrix 1102, in which N can correspond to a relatively large amount of columns (e.g., N can represent over 10,000 bits). As discussed above, the compute device 100 may maintain a counter to associate with each row that is indicative of a number of matches in column indices associated with the row to the reference hyper-dimensional vector 1104. In this case, the compute device 100 identifies, in the matrix 1102, two matrices as candidate data (indicated by the one-way arrows pointing to the rows). The two candidate data are associated with eight matches and seven matches. The compute device 100 may return, to a requesting application, each of the candidate data, a location associated with each data, as well as information relating to the number of matches. An application, in turn, may process such data as needed.

EXAMPLES

Illustrative examples of the technologies disclosed herein are provided below. An embodiment of the technologies may include any one or more, and any combination of, the examples described below.

Example 1 includes a device comprising a memory; and a memory controller configured to receive a key and a memory address of the key stored in the memory of the compute device; generate a key hyper-dimensional vector associated with the key by randomly assigning a bit value, adding a logical pointer indicative of the memory address where the key is stored in the memory and includes an error correcting code; store the key hyper-dimensional vector in a hyper-dimensional vector table; receive a value and a memory address of the value stored in the memory; generate a value hyper-dimensional vector associated with the value by randomly assigning a bit value, adding a logical pointer indicative of the memory address where they value is stored in the memory and an error correcting code; store the value hyper-dimensional vector in the hyper-dimensional vector table; and generate a search hyper-dimensional vector using the key hyper-dimensional vector and the value hyper-dimensional vector to be used for future lookup operations.

Example 2 includes the subject matter of Example 1, and wherein to generate the search hyper-dimensional vector comprises to generate a bound vector by performing a bitwise XOR operation on the key hyper-dimensional vector and the value hyper-dimensional vector; perform a bitwise sum operation on the bound vector and a previous vector that has bitwise sum of all previously bound hyper-dimensional vectors to generate a resulting vector; determine a total number of vectors that were added to generate the resulting vector; and perform a threshold operation on the resulting vector by dividing the resulting vector by the total number of vectors to generate a resulting threshold bit value and setting a corresponding bit value to one if the resulting threshold bit value is greater than a threshold value and to zero if the resulting threshold bit value is less than the threshold value.

Example 3 includes the subject matter of any of Examples 1 and 2, and wherein the memory controller is further to generate a key hash table including a key vector pointer indicative of a memory location of where the key hyper-dimensional vector is stored in the hyper-dimensional vector table; and generate a value hash table including a value vector pointer indicative of a memory location of where the value hyper-dimensional vector is stored in the hyper-dimensional vector table.

Example 4 includes the subject matter of any of Examples 1-3, and wherein to generate the key hash table comprises to perform a hash function to hash the key.

Example 5 includes the subject matter of any of Examples 1-4, and wherein to generate the key hyper-dimensional vector associated with the key comprises to determine whether the key exists in the key hash table and generate, in response to determination that the key does not exist in the key hash table, the key hyper-dimensional vector associated with the key.

Example 6 includes the subject matter of any of Examples 1-5, and wherein to generate the key hash table comprises to assign the key vector pointer to the key hyper-dimensional vector.

Example 7 includes the subject matter of any of Examples 1-6, and wherein to generate the value hash table comprises to perform a hash function to hash the value.

Example 8 includes the subject matter of any of Examples 1-7, and wherein to generate the value hyper-dimensional vector associated with the value comprises to determine whether the value exists in the value hash table and generate, in response to determination that the value does not exist in the value hash table, the value hyper-dimensional vector associated with the value.

Example 9 includes the subject matter of any of Examples 1-8, and wherein to generate the value hash table comprises to assign the value vector pointer to the value hyper-dimensional vector.

Example 10 includes a device comprising a memory; and a memory controller configured to receive a query from a requestor; determine, in response to a receipt of the query, a key hyper-dimensional vector associated with the query; perform a hyper-dimensional operation to determine a reference hyper-dimensional vector associated with a value to the key; perform a nearest neighbor search by searching columns of a stochastic associative array of a hyper-dimensional vector table in the memory; identify a closest matching row in the stochastic associative array relative to the reference hyper-dimensional vector, wherein the closest matching row indicates a closest matching value hyper-dimensional vector; and output a value associated with the closest matching value hyper-dimensional vector.

Example 11 includes the subject matter of Example 10, and wherein the hyper-dimensional vector table includes a plurality of value hyper-dimensional vectors, each value hyper-dimensional vector includes a hyper-dimensional vector with a pointer to a memory address where the value is stored in the memory and an error correction code.

Example 12 includes the subject matter of any of Examples 10 and 11, and wherein to perform the hyper-dimensional operation to determine the reference hyper-dimensional vector associated with a value to the key comprises to perform an XOR operation on the key hyper-dimensional vector with a search hyper-dimensional vector.

Example 13 includes the subject matter of any of Examples 10-12, and wherein to perform the nearest neighbor search comprises to search the columns of the stochastic associative array for matching bit values relative to a corresponding bit position of the reference hyper-dimensional vector, wherein each column of the stochastic associative array represents a bit value of a corresponding row.

Example 14 includes the subject matter of any of Examples 10-13, and wherein to identify the closest matching row comprises to identify the closest matching row in the stochastic associative array that has a highest number of matching bit values.

Example 15 includes the subject matter of any of Examples 10-14, and wherein to perform the nearest neighbor search comprises to search a subset of columns of the stochastic associative array for matching bit values relative to a corresponding bit position of the reference hyper-dimensional vector.

Example 16 includes the subject matter of any of Examples 10-15, and wherein the memory controller is further to perform an error correction algorithm to correct one or more errors in the closest matching value hyper-dimensional vector; and output, in response to a performance of the error correction algorithm, a corrected value of the closest matching value hyper-dimensional vector.

Example 17 includes the subject matter of any of Examples 10-16, and wherein to output the value associated with the closest matching row comprises to obtain a value from a pointer indicated in the closest matching value hyper-dimensional vector.

Example 18 includes a method comprising receiving, by a memory controller of a compute device, a key and a memory address of the key stored in a memory of the compute device; generating, by the memory controller, a key hyper-dimensional vector associated with the key by randomly assigning a bit value, adding a logical pointer indicative of the memory address where the key is stored in the memory and includes an error correcting code; storing, by the memory controller, the key hyper-dimensional vector in a hyper-dimensional vector table; receiving, by the memory controller, a value and a memory address of the value stored in the memory; generating, by the memory controller, a value hyper-dimensional vector associated with the value by randomly assigning a bit value, adding a logical pointer indicative of the memory address where they value is stored in the memory and an error correcting code; storing, by the memory controller, the value hyper-dimensional vector in the hyper-dimensional vector table; and generating, by the memory controller, a search hyper-dimensional vector using the key hyper-dimensional vector and the value hyper-dimensional vector to be used for future lookup operations.

Example 19 includes the subject matter of Example 18, and wherein generating the search hyper-dimensional vector comprises generating a bound vector by performing a bitwise XOR operation on the key hyper-dimensional vector and the value hyper-dimensional vector; performing a bitwise sum operation on the bound vector and a previous vector that has bitwise sum of all previously bound hyper-dimensional vectors to generate a resulting vector; determining a total number of vectors that were added to generate the resulting vector; and performing a threshold operation on the resulting vector by dividing the resulting vector by the total number of vectors to generate a resulting threshold bit value and setting a corresponding bit value to one if the resulting threshold bit value is greater than a threshold value and to zero if the resulting threshold bit value is less than the threshold value.

Example 20 includes the subject matter of any of Examples 18 and 19, and further including generating, by the memory controller, a key hash table including a key vector pointer indicative of a memory location of where the key hyper-dimensional vector is stored in the hyper-dimensional vector table; and generating, by the memory controller, a value hash table including a value vector pointer indicative of a memory location of where the value hyper-dimensional vector is stored in the hyper-dimensional vector table.

Example 21 includes the subject matter of any of Examples 18-20, and wherein generating the key hash table comprises performing a hash function to hash the key.

Example 22 includes the subject matter of any of Examples 18-21, and wherein generating the key hyper-dimensional vector associated with the key comprises determining whether the key exists in the key hash table and generating, in response to determining that the key does not exist in the key hash table, the key hyper-dimensional vector associated with the key.

Example 23 includes the subject matter of any of Examples 18-22, and wherein generating the key hash table comprises assigning the key vector pointer to the key hyper-dimensional vector.

Example 24 includes the subject matter of any of Examples 18-23, and wherein generating the value hash table comprises performing a hash function to hash the value.

Example 25 includes the subject matter of any of Examples 18-24, and wherein generating the value hyper-dimensional vector associated with the value comprises determining whether the value exists in the value hash table and generating, in response to determining that the value does not exist in the value hash table, the value hyper-dimensional vector associated with the value.

Example 26 includes the subject matter of any of Examples 18-25, and wherein generating the value hash table comprises assigning the value vector pointer to the value hyper-dimensional vector.

Example 27 includes the subject matter of any of Examples 18-26, and further including receiving, by the memory controller, a query from a requestor indicative of a key hyper-dimensional vector; determining, in response to receiving the query and by the memory controller, the key hyper-dimensional vector associated with the query; performing, by the memory controller, a hyper-dimensional operation to determine a reference hyper-dimensional vector associated with a value to the key; performing, by the memory controller, a nearest neighbor search by searching columns of a stochastic associative array of a hyper-dimensional vector table in the memory; identifying, by the memory controller, a closest matching row in the stochastic associative array relative to the reference hyper-dimensional vector, wherein the closest matching row indicates a closest matching value hyper-dimensional vector; and outputting, by the memory controller, a value associated with the closest matching value hyper-dimensional vector.

Example 28 includes the subject matter of any of Examples 18-27, and wherein the hyper-dimensional vector table includes a plurality of value hyper-dimensional vectors, each value hyper-dimensional vector includes a hyper-dimensional vector with a pointer to a memory address where the value is stored in the memory and an error correction code.

Example 29 includes the subject matter of any of Examples 18-28, and wherein performing the hyper-dimensional operation to determine the reference hyper-dimensional vector associated with a value to the key comprises performing, by the memory controller, an XOR operation on the key hyper-dimensional vector with a search hyper-dimensional vector.

Example 30 includes the subject matter of any of Examples 18-29, and wherein performing the nearest neighbor search comprises searching, by the memory controller, the columns of the stochastic associative array for matching bit values relative to a corresponding bit position of the reference hyper-dimensional vector, wherein each column of the stochastic associative array represents a bit value of a corresponding row.

Example 31 includes the subject matter of any of Examples 18-30, and wherein identifying the closest matching row comprises identifying, by the memory controller, the closest matching row in the stochastic associative array that has a highest number of matching bit values.

Example 32 includes the subject matter of any of Examples 18-31, and wherein performing the nearest neighbor search comprises searching, by the memory controller, a subset of columns of the stochastic associative array for matching bit values relative to a corresponding bit position of the reference hyper-dimensional vector.

Example 33 includes the subject matter of any of Examples 18-32, and further including performing, by the memory controller, an error correction algorithm to correct one or more errors in the closest matching value hyper-dimensional vector; and outputting, in response to a performance of the error correction algorithm and by the memory controller, a corrected value of the closest matching value hyper-dimensional vector. Example 34 includes the subject matter of any of Examples 18-33, and wherein outputting the value associated with the closest matching row comprises obtaining a value from a pointer indicated in the closest matching value hyper-dimensional vector.

The invention claimed is:

1. A device comprising:
a memory; and
a memory controller configured to:
receive a key and a memory address of the key stored in the memory;
generate a key hyper-dimensional vector associated with the key by randomly assigning a bit value, adding a logical pointer indicative of the memory address where the key is stored in the memory and includes an error correcting code;
store the key hyper-dimensional vector in a hyper-dimensional vector table;
receive a value and a memory address of the value stored in the memory;
generate a value hyper-dimensional vector associated with the value by randomly assigning a bit value, adding a logical pointer indicative of the memory address where the value is stored in the memory and an error correcting code;
store the value hyper-dimensional vector in the hyper-dimensional vector table; and
generate a search hyper-dimensional vector using the key hyper-dimensional vector and the value hyper-dimensional vector to be used for future lookup operations.

2. The device of claim 1, wherein to generate the search hyper-dimensional vector comprises to:
generate a bound vector by performing a bitwise XOR operation on the key hyper-dimensional vector and the value hyper-dimensional vector;
perform a bitwise sum operation on the bound vector and a previous vector that has bitwise sum of all previously bound hyper-dimensional vectors to generate a resulting vector;
determine a total number of vectors that were added to generate the resulting vector; and
perform a threshold operation on the resulting vector by dividing the resulting vector by the total number of vectors to generate a resulting threshold bit value and setting a corresponding bit value to one if the resulting threshold bit value is greater than a threshold value and to zero if the resulting threshold bit value is less than the threshold value.

3. The device of claim 1, wherein the memory controller is further to:

generate a key hash table including a key vector pointer indicative of a memory location of where the key hyper-dimensional vector is stored in the hyper-dimensional vector table; and generate a value hash table including a value vector pointer indicative of a memory location of where the value hyper-dimensional vector is stored in the hyper-dimensional vector table.

4. A device comprising:

a memory; and a memory controller configured to:

receive a query from a requestor;

determine, in response to a receipt of the query, a key hyper-dimensional vector associated with the query;

perform a hyper-dimensional operation to determine a reference hyper-dimensional vector associated with a value to the key;

perform a nearest neighbor search by searching columns of a stochastic associative array of a hyper-dimensional vector table in the memory;

identify a closest matching row in the stochastic associative array relative to the reference hyper-dimensional vector, wherein the closest matching row indicates a closest matching value hyper-dimensional vector; and output a value associated with the closest matching value hyper-dimensional vector.

5. The device of claim 4, wherein the hyper-dimensional vector table includes a plurality of value hyper-dimensional vectors, each value hyper-dimensional vector includes a hyper-dimensional vector with a pointer to a memory address where the value is stored in the memory and an error correction code.

6. The device of claim 4, wherein to perform the hyper-dimensional operation to determine the reference hyper-dimensional vector associated with a value to the key comprises to perform an XOR operation on the key hyper-dimensional vector with a search hyper-dimensional vector.

7. The device of claim 4, wherein to perform the nearest neighbor search comprises to search the columns of the stochastic associative array for matching bit values relative to a corresponding bit position of the reference hyper-dimensional vector, wherein each column of the stochastic associative array represents a bit value of a corresponding row.

8. The device of claim 7, wherein to identify the closest matching row comprises to identify the closest matching row in the stochastic associative array that has a highest number of matching bit values.

9. The device of claim 4, wherein to perform the nearest neighbor search comprises to search a subset of columns of the stochastic associative array for matching bit values relative to a corresponding bit position of the reference hyper-dimensional vector.

10. The device of claim 5, wherein the memory controller is further to:

perform an error correction algorithm to correct one or more errors in the closest matching value hyper-dimensional vector; and output, in response to a performance of the error correction algorithm, a corrected value of the closest matching value hyper-dimensional vector.

11. The device of claim 10, wherein to output the value associated with the closest matching row comprises to obtain a value from a pointer indicated in the closest matching value hyper-dimensional vector.

12. A method comprising:

receiving, by a memory controller of a compute device, a key and a memory address of the key stored in a memory of the compute device;

generating, by the memory controller, a key hyper-dimensional vector associated with the key by randomly assigning a bit value, adding a logical pointer indicative of the memory address where the key is stored in the memory and includes an error correcting code;

storing, by the memory controller, the key hyper-dimensional vector in a hyper-dimensional vector table;

receiving, by the memory controller, a value and a memory address of the value stored in the memory;

generating, by the memory controller, a value hyper-dimensional vector associated with the value by randomly assigning a bit value, adding a logical pointer indicative of the memory address where the value is stored in the memory and an error correcting code;

storing, by the memory controller, the value hyper-dimensional vector in the hyper-dimensional vector table; and generating, by the memory controller, a search hyper-dimensional vector using the key hyper-dimensional vector and the value hyper-dimensional vector to be used for future lookup operations.

13. The method of claim 12, wherein generating the search hyper-dimensional vector comprises:

generating a bound vector by performing a bitwise XOR operation on the key hyper-dimensional vector and the value hyper-dimensional vector;

performing a bitwise sum operation on the bound vector and a previous vector that has bitwise sum of all previously bound hyper-dimensional vectors to generate a resulting vector;

determining a total number of vectors that were added to generate the resulting vector; and performing a threshold operation on the resulting vector by dividing the resulting vector by the total number of vectors to generate a resulting threshold bit value and setting a corresponding bit value to one if the resulting threshold bit value is greater than a threshold value and to zero if the resulting threshold bit value is less than the threshold value.

14. The method of claim 12 further comprising:

generating, by the memory controller, a key hash table including a key vector pointer indicative of a memory location of where the key hyper-dimensional vector is stored in the hyper-dimensional vector table; and generating, by the memory controller, a value hash table including a value vector pointer indicative of a memory location of where the value hyper-dimensional vector is stored in the hyper-dimensional vector table.

15. The method of claim 14 further comprising:

receiving, by the memory controller, a query from a requestor indicative of a key hyper-dimensional vector;

determining, in response to receiving the query and by the memory controller, the key hyper-dimensional vector associated with the query;

performing, by the memory controller, a hyper-dimensional operation to determine a reference hyper-dimensional vector associated with a value to the key;

performing, by the memory controller, a nearest neighbor search by searching columns of a stochastic associative array of a hyper-dimensional vector table in the memory;

identifying, by the memory controller, a closest matching row in the stochastic associative array relative to the reference hyper-dimensional vector, wherein the closest matching row indicates a closest matching value hyper-dimensional vector; and outputting, by the memory controller, a value associated with the closest matching value hyper-dimensional vector.

16. The method of claim 15, wherein the hyper-dimensional vector table includes a plurality of value hyper-dimensional vectors, each value hyper-dimensional vector includes a hyper-dimensional vector with a pointer to a memory address where the value is stored in the memory and an error correction code.

17. The method of claim 15, wherein performing the hyper-dimensional operation to determine the reference hyper-dimensional vector associated with a value to the key comprises performing, by the memory controller, an XOR operation on the key hyper-dimensional vector with a search hyper-dimensional vector.

18. The method of claim 15, wherein performing the nearest neighbor search comprises searching, by the memory controller, the columns of the stochastic associative array for matching bit values relative to a corresponding bit position of the reference hyper-dimensional vector, wherein each column of the stochastic associative array represents a bit value of a corresponding row.

19. The method of claim 18, wherein identifying the closest matching row comprises identifying, by the memory controller, the closest matching row in the stochastic associative array that has a highest number of matching bit values.

20. The method of claim 15, wherein performing the nearest neighbor search comprises searching, by the memory controller, a subset of columns of the stochastic associative array for matching bit values relative to a corresponding bit position of the reference hyper-dimensional vector.

* * * * *